United States Patent
Dietrich

(10) Patent No.: US 7,922,266 B2
(45) Date of Patent: Apr. 12, 2011

(54) CHAIN TENSIONING DEVICE

(75) Inventor: Michael Dietrich, Dortmund (DE)

(73) Assignee: Bucyrus Hex GmbH, Dortmund (DE)

( * ) Notice: Subject to any disclaimer, the term of this patent is extended or adjusted under 35 U.S.C. 154(b) by 0 days.

(21) Appl. No.: 12/438,653

(22) PCT Filed: Aug. 21, 2007

(86) PCT No.: PCT/EP2007/007343
§ 371 (c)(1),
(2), (4) Date: Feb. 24, 2009

(87) PCT Pub. No.: WO2008/022763
PCT Pub. Date: Feb. 28, 2008

(65) Prior Publication Data
US 2009/0289496 A1   Nov. 26, 2009

(30) Foreign Application Priority Data
Aug. 24, 2006   (DE) .......................... 10 2006 039 731

(51) Int. Cl.
*B62D 55/30* (2006.01)
(52) U.S. Cl. .......................... 305/145; 305/143; 305/149
(58) Field of Classification Search .................. 305/143, 305/145, 149, 153, 155
See application file for complete search history.

(56) References Cited

U.S. PATENT DOCUMENTS

| | | | | |
|---|---|---|---|---|
| 3,901,563 A | * | 8/1975 | Day | 305/146 |
| 4,457,564 A | * | 7/1984 | Ruge et al. | 305/149 |
| 4,681,376 A | | 7/1987 | Riml | |
| 4,859,006 A | * | 8/1989 | Philippe et al. | 305/148 |
| 4,887,872 A | * | 12/1989 | Adams et al. | 305/147 |
| 5,005,920 A | * | 4/1991 | Kinsinger | 305/146 |
| 6,354,678 B1 | * | 3/2002 | Oertley | 305/144 |

FOREIGN PATENT DOCUMENTS

| | | |
|---|---|---|
| DE | 350785 | 3/1935 |
| DE | 1810354 | 9/1970 |
| DE | 3104323 | 8/1982 |
| DE | 19919959 | 11/2000 |
| EP | 1365172 A2 * | 11/2003 |

OTHER PUBLICATIONS

International Search Report of PCT/EP2007/007343 mailed Dec. 4, 2007 w/ English translation.
Written Office Action of PCT/EP2007/007343 w/ English translation.
International Preliminary Examination Report of PCT/EP2007/007343 dated Nov. 5, 2008 w/ English translation.

* cited by examiner

*Primary Examiner* — S. Joseph Morano
*Assistant Examiner* — Kip T Kotter
(74) *Attorney, Agent, or Firm* — Venable LLP; Robert Kinberg; Leigh D. Thelen

(57) ABSTRACT

A device for tensioning chains on crawler-type or tracked vehicles, in particular the chains of hydraulic excavators, comprises a first cylinder arranged in an area of the chassis for the tracked vehicle, and operatively connected via a piston rod to a guide wheel to tension the chain. A second cylinder forms a spring cylinder and is operatively connected to the first cylinder. The second cylinder concentrically encloses the first cylinder to form a double cylinder and each cylinder is provided with a separate hydraulic connection. At startup of the tracked vehicle, the hydraulic connections of the double cylinder are admitted with a specifiable pre-tensioning pressure. The spring cylinder can be moved with maximum spring travel to its end position because of its larger cross-sectional surface, and the tensioning cylinder pre-tensions the chain with a force that corresponds to the pre-tensioning pressure.

3 Claims, 4 Drawing Sheets

CHAIN TENSIONING DEVICE

CROSS REFERENCE TO RELATED APPLICATIONS

This application is a U.S. National Stage of International Application No. PCT/EP2007/007343 filed Aug. 21, 2007, designating the United States and claiming priority from German Application No. DE 10 2006039 731.2 filed Aug. 24, 2006.

BACKGROUND

The invention relates to a device for tensioning the chains of crawler-type or tracked vehicles, in particular the chains of hydraulic excavators.

The document DE-C 35 07 805 discloses a device for tensioning the chains of tracked vehicles, with a first hydraulic cylinder for tensioning the chain deflection wheel, which is positioned in a bearing that is positioned displaceable in the center plane for the chain, wherein this first hydraulic cylinder is connected to a second hydraulic cylinder such that a floating piston, is arranged together with a return valve, which connects the chamber halves separated by the piston, and blocks the return flow from the first hydraulic cylinder. The piston can be displaced inside an additional hydraulic cylinder, between front and back end stops, wherein the displacement distance corresponds to a volume of the hydraulic fluid, which is required for relaxing the load on the previously tensioned chain, so as to achieve the most favorable chain tension. In the region of the back end stops, the second hydraulic cylinder is connected to a feed line for feeding in pressure medium and, in the region of the front end stops, with a return-flow line for discharging the pressure medium with a pressure corresponding to the chain tensioning pressure. The feed line is connected to the tank once the piston has been moved against the front end stop.

With this prior art, the hydraulic cylinders are arranged in a line, meaning one behind the other, which results in a relatively long structural length. As a result, the cylinders are positioned extremely close to the guide wheel, are subject to contamination, and can be maintained only with great difficulty.

The document DE 31 04 323 A1 discloses a tensioning device that acts upon the circulating chain of a tracked vehicle and preferably upon a guide wheel of a chain-type tracked vehicle. The tensioning device is embodied as working cylinder connected to a pressure-controlled hydraulic source, the cylinder chamber of which guides a tensioning piston pushing against the guide wheel, which is provided with a pressure-relief valve and has a return valve installed in the intake for the hydraulic medium source. The tensioning piston is guided inside a holding cylinder, which in turn is embodied as holding piston guided inside the working cylinder. The piston bottom of the holding piston is provided with an opening into which a second return valve is inserted. The disadvantage of said double cylinder is that if the return valve in the piston bottom of the holding piston fails, the double cylinder must be taken apart completely.

The DE 18 10 354 discloses a device for tensioning and supporting the drive chains on a tracked vehicle, comprising an adjustable support and a support for the guide wheels that is dependent on the chain tensioning force. The adjustable support consists of a piston-cylinder unit for a pressure medium with high viscosity (grease). The tension-force dependent support is composed of a piston-cylinder unit for a pressure medium with low viscosity (oil), wherein the pressure medium can be diverted from the pressure-medium drive of the chassis. The piston-cylinder units are arranged coaxial and combined into one structural unit.

As a result of the incompressibility of the different media that are used (grease—oil), it is possible that the hydraulic circulation builds up, in particular when traveling over uneven terrain, so that damages can possibly occur.

SUMMARY

It is therefore the goal of the present invention to provide a device for tensioning the chains of crawler-type or tracked vehicles, in particular the chains of hydraulic excavators, which make possible a compact design, can be easily assembled/dismantled and be replaced even with the chain closed.

This goal is achieved with the aid of a device for tensioning the chains of crawler-type or tracked vehicles, in particular the chains of hydraulic excavators, comprising a first cylinder that is arranged in the region of a crawler chassis for the tracked vehicle, is operatively connected via a piston rod to a guide wheel and forms a tensioning cylinder, and which further comprises a second cylinder that is operatively connected to the first cylinder and forms a spring cylinder, wherein the second cylinder concentrically surrounds the first cylinder in order to form a double cylinder and wherein each cylinder is provided with a separate hydraulic connection, wherein for the startup of the tracked vehicle, the hydraulic connections for the double cylinder are admitted with a specifiable pre-tensioning pressure, the tensioning cylinder concentrically surrounded by the fixed spring cylinder can be guided toward the end stop presented by the spring cylinder with a maximum spring deflection due to the larger cross-sectional surface formed by the tensioning cylinder relative to the tensioning cylinder piston, and the tensioning cylinder pre-tensions the chain with a force that corresponds to the pre-tensioning pressure.

Advantageous modifications of the subject matter of the invention follow from the dependent claims.

A compact and lightweight structure is thus formed, as compared to the prior art, so that the double cylinder can be installed into the respective chassis as far as possible removed from the guide wheel that is subject to contamination. A maintenance opening is advantageously provided in the upper portion of the respective chassis, which allows access to the double cylinder for maintenance operations or for the replacement.

In the operational state, the spring cylinder is connected to a storage device (membrane reservoir, bubble reservoir or the like), wherein in this operating state the oil chamber for the tensioning cylinder is completely partitioned off, with respect to the pressure.

If necessary, the tensioning cylinder can also be operated advantageously by using grease.

It is furthermore conceivable to use separate pre-stressing pressures for the tensioning cylinder and the spring cylinder in order to meet the requirements of different operating conditions, such as when the excavator is traveling along a flat, inclined or downhill surface.

The spring force in that case is independent of the pre-stressing force. The level of the pre-stressing force is determined by the diameter of the spring cylinder and the configuration of the storage area.

As compared to the prior art, the invention has the following advantages:

the pre-stressing of the chain and the spring force can be adjusted separately for separate hydraulic media connections and separate admitting of the cylinders;

an extremely compact design for the device, as well as low weight;

the easy dismantling and replacement of the double cylinder while the chain is closed;

the double cylinder can be positioned far removed from the guide wheel that is subject to contamination;

the possibility of an automatic readjustment to correct wear, without changing the pre-tensioning force and the spring force;

no transfer of lateral forces to the double cylinder; maintenance operations can be carried out with standard tools.

BRIEF DESCRIPTION OF THE DRAWINGS

The subject matter of the invention is illustrated with the aid of an exemplary embodiment shown in the drawing and is described as follows by showing in.

DETAILED DESCRIPTION

Figure 1:
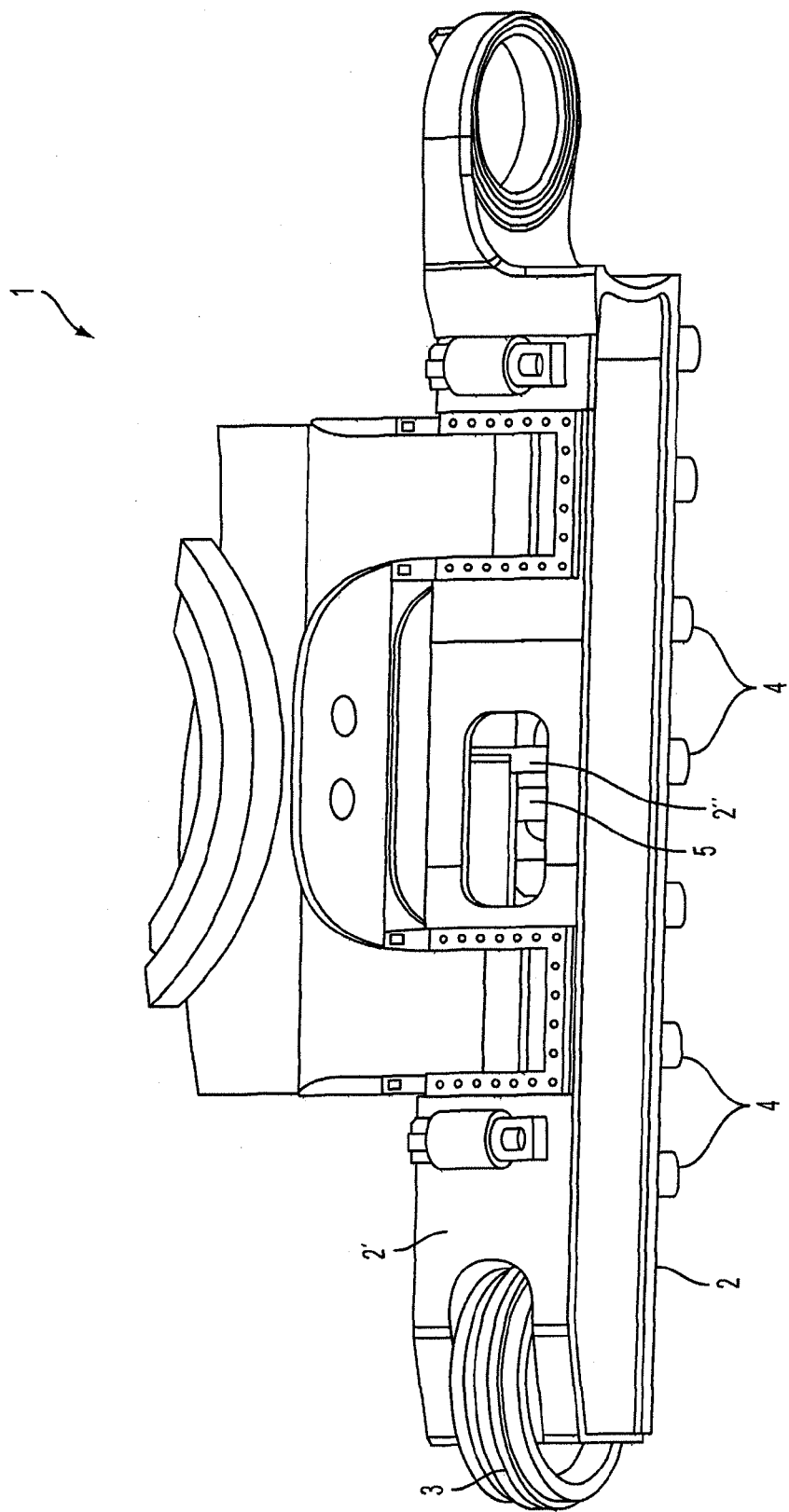
FIG. 1 A partial representation of an undercarriage for a hydraulic excavator.

FIG. 1 shows a basic diagram for the undercarriage 1 of a hydraulic excavator, which is only indicated and not shown in further detail herein and which moves along on tracks, for example a large hydraulic excavator that can be used in a mine or the like. The undercarriage 1 is provided with crawler chassis 2, comprising at least one guide wheel 3 as well as drive rollers 4. Only indicated is a device 5 for tensioning the chains (tracks) that are not shown herein. A maintenance opening 2" for access to the device 5 is provided in the crawler chassis 2 or its upper belt 2'.

Figure 2:
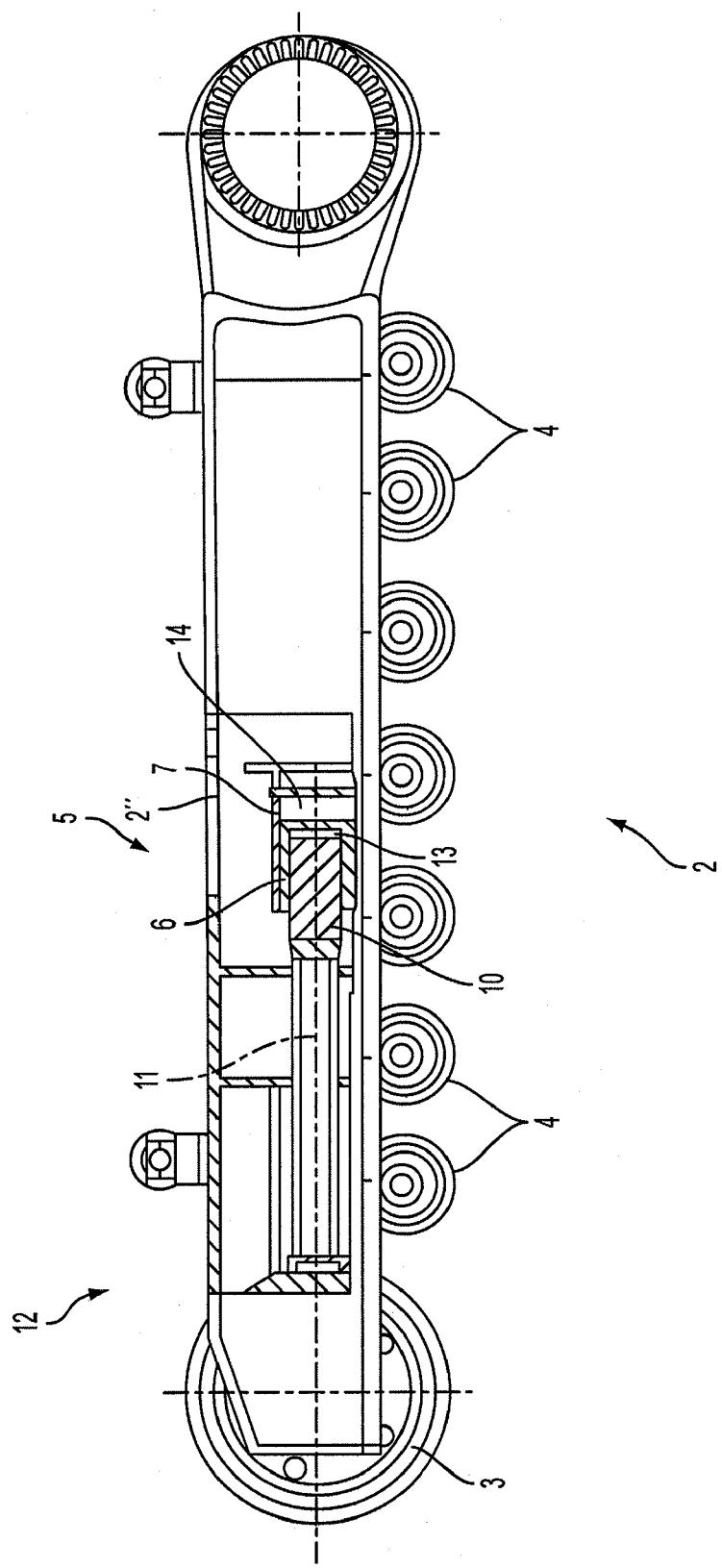
FIG. 2 An illustrated detail of a crawler chassis.

FIG. 2 shows a partial view of the crawler chassis 2 illustrated in FIG. 1. Visible are the guide wheel 3, the drive rollers 4, as well as the device 5. The device 5 according to the invention is a double cylinder, which is formed by a tensioning cylinder 6, which comprises a tensioning cylinder tube and which also functions as a spring cylinder piston 10', and a spring cylinder 7, which concentrically surrounds the tensioning cylinder 6. The tensioning cylinder 6 and the spring cylinder 7 are each provided with a separate hydraulic connection (not visible herein) by means of which they are connected to at least one source for a pressure medium. Hydraulic oil is to be used in both cases for the pressure medium. The tensioning cylinder 6 comprises a tensioning piston 10, which is operatively connected to a piston rod 11 that is positioned on the guide wheel side in the area of a hinge point 12, existing in this area.

Figure 3:
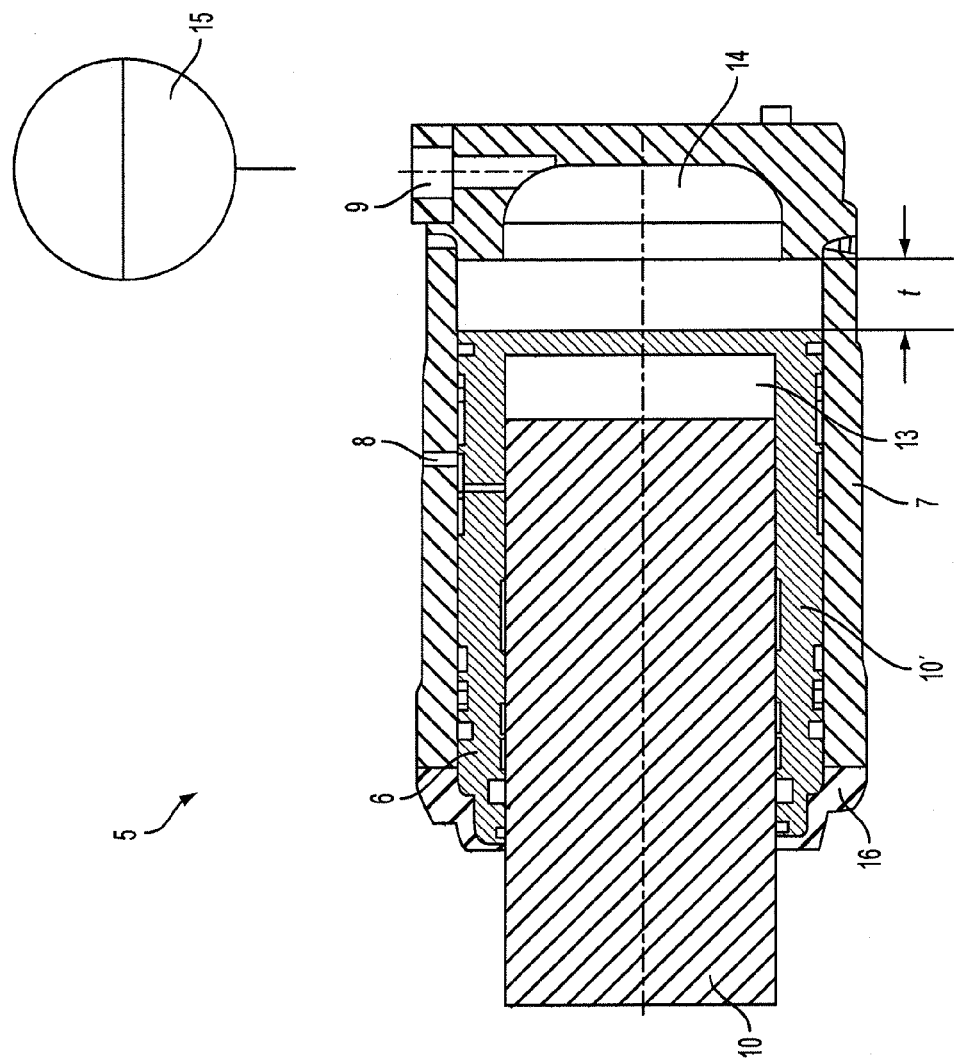
FIG. 3 An illustrated detail of the double cylinder.

FIG. 3 shows the double cylinder 5 as an individual component. Visible are the tensioning cylinder tube 6, the spring cylinder tube 7, the tensioning cylinder piston 10, the spring cylinder piston 10', the oil chambers 13, 14 as well as the separate hydraulic connections 8, 9 for the tensioning cylinder 6 and the spring cylinder 7. Furthermore indicated is the spring deflection t for the tensioning cylinder tube 6, which—as previously mentioned—is formed by the spring cylinder piston 10' that comes to rest against an end stop 16 when the spring is at the maximum distance t. The membrane or bubble reservoir 15 is shown only with a symbol.

Figure 4:
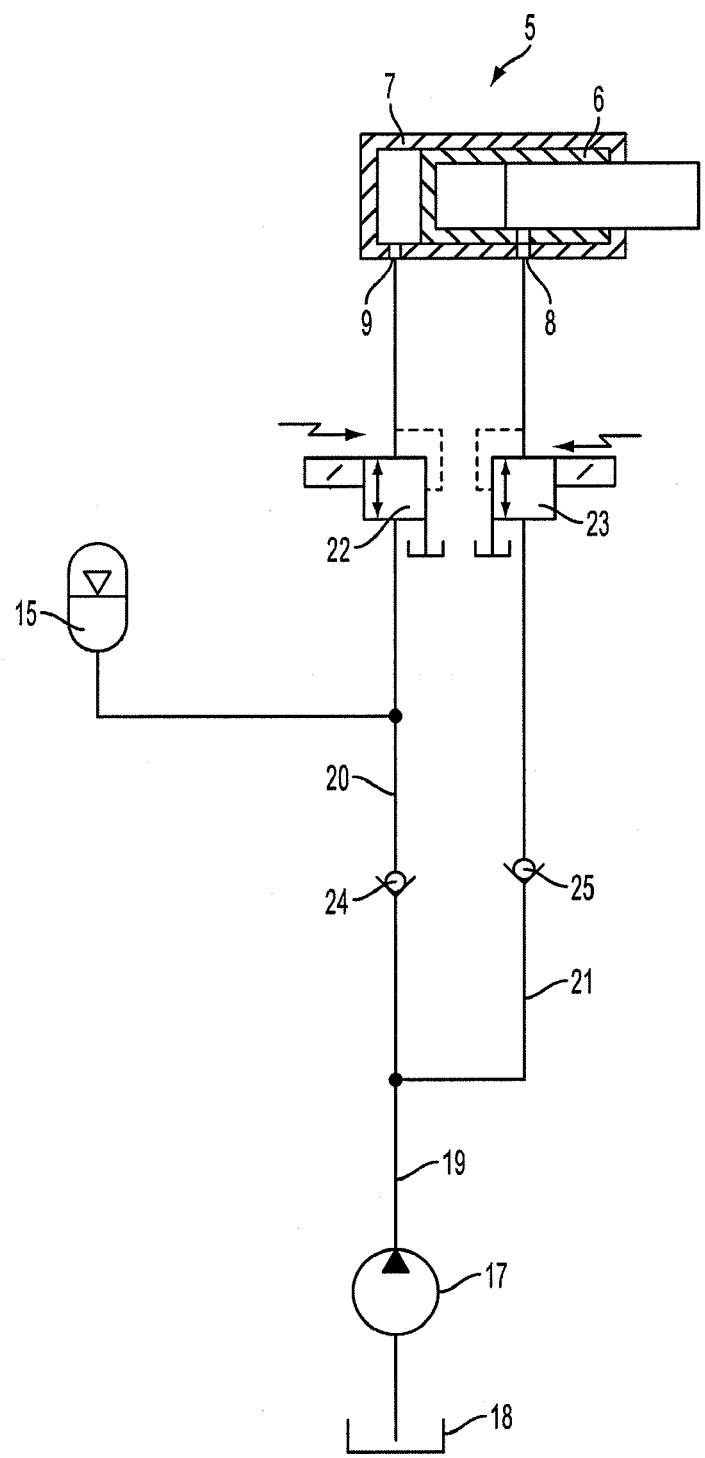
FIG. 4 A basic diagram for the hydraulic connections for admitting the double cylinder with pressure.

The exemplary embodiment in FIG. 4 only shows a conceivable hydraulic-connection diagram for operating the double cylinder 5. Visible is a pump 17 that pumps hydraulic oil from a reservoir 18 via a line 19 in the direction of the two cylinders 6, 7. The line 19 is divided into two separate lines 20, 21 and the hydraulic oil is supplied to the respective hydraulic connection 8, 9. Pressure-relief valves 22, 23 are installed in the respective line 20, 21. In the same way, return valves 24, 25 are also provided. For the exemplary embodiment, the latter function as automatically operating hydraulic shutoff valves. The previously mentioned membrane or bubble reservoir 15 is connected to the line 20.

When starting up the hydraulic excavator, the separate hydraulic connections 8, 9 for the tensioning cylinder 6 and the spring cylinder 7 are admitted with a pre-tensioning pressure p0. As a result of the larger cross-sectional surface of the tensioning cylinder 6, relative to the tensioning cylinder piston 10, the tensioning cylinder 6, concentrically surrounded by the spring cylinder tube 7, travels to end stop 16 with maximum spring deflection t. The tensioning cylinder 6 tensions the chains with a force that corresponds to the pre-tensioning pressure p0. The pre-tensioning pressure p0 therefore must be adapted to the respective dimensions for the machine and/or the chain length, the chain slack and the chain weight.

Both cylinders 6, 7 which form the double cylinder 5 are subsequently separated with respect to pressure via the pressure-relief valves 22, 23 and are disconnected from the respective line 20, 21 for the pre-tensioning pressure p0. The oil chamber 13 of the tensioning cylinder 6 is now completely cut off while the oil chamber 14 of the spring cylinder 7 is connected via the hydraulic connection 9 and the line 20 to the reservoir 15.

In this operating condition, the tensioning cylinder 6 only passively connects the tensioning piston 10 and the spring piston 10'. Changes in the chain length during the operation of the machine are guided from the guide wheel 3 via the tension piston 10 through the oil in the oil chamber 13, which is completely cut off from the hydraulic connection 8, to the spring piston 10' and along to the oil in the oil chamber 14. The spring cylinder 7 then absorbs all changes in the chain length that occur during the operation (e.g. polygonal effects, impacts, or the like).

The spring force is consequently independent of the pre-tensioning force. The level of the spring force is determined by the diameter of the spring cylinder tube 7 and the configuration of the reservoir 15.

As compared to the prior art, an extremely compact structural design is thus obtained when using the double cylinder 5 according to the invention. As a result of the maintenance and service opening 2", the dismantling and replacement of the double cylinder 5 can be realized easily, even if the chain is closed. The double cylinder 5 is positioned far removed from the guide wheel 3 that is subject to contamination, and does not absorb lateral forces.

If necessary, the cylinders 6, 7 can be operated with different pre-tensioning pressures when separate hydraulic loops are used.

The invention claimed is:

1. A device for tensioning a chain of a crawler chassis of a tracked vehicle, comprising:
   a guide wheel;
   a piston rod;
   a first cylinder arranged in an area of the chassis for the tracked vehicle and operatively connected by the piston rod to the guide wheel to apply tension to the chain;

a second cylinder, constituting a spring cylinder, operatively connected to the first cylinder and concentrically enclosing the first cylinder to form a double cylinder, wherein the first and second cylinders have separate hydraulic connections to connect to separate lines, the separate hydraulic connections each being admitted with a specifiable pre-tensioning pressure at startup of the tracked vehicle so that the first cylinder concentrically surrounded by the second cylinder is moved with maximum spring deflection to an end stop presented by the second cylinder because of a larger cross-sectional surface of the first cylinder relative to the surface of the piston rod, and the first cylinder pre-tensions the chain with a force that corresponds to the pre-tensioning pressure.

2. The device according to claim 1, further including a hydraulic reservoir and wherein the second cylinder is connected to the hydraulic reservoir during an operating condition of the tracked vehicle and the first cylinder includes an oil chamber completely closed off with respect to the pressure during the operating condition.

3. The device according to claim 1, wherein the first cylinder comprises a tensioning cylinder tube and the second cylinder comprises a spring cylinder tube, and the first and second cylinders are adapted to operate under controllable pre-tensioning pressures.

* * * * *